(12) United States Patent
Onodera et al.

(10) Patent No.: US 8,123,909 B2
(45) Date of Patent: Feb. 28, 2012

(54) APPARATUS FOR TREATING PAPERMAKING FEEDSTOCK

(75) Inventors: Isao Onodera, Tokyo (JP); Keigo Watanabe, Tokyo (JP); Shisei Goto, Tokyo (JP); Yohji Tuji, Tokyo (JP); Takeshi Iimori, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 451 days.

(21) Appl. No.: 12/091,853

(22) PCT Filed: Nov. 2, 2006

(86) PCT No.: PCT/JP2006/321997
§ 371 (c)(1),
(2), (4) Date: Apr. 28, 2008

(87) PCT Pub. No.: WO2007/052760
PCT Pub. Date: May 10, 2007

(65) Prior Publication Data
US 2009/0114360 A1    May 7, 2009

(30) Foreign Application Priority Data

Nov. 4, 2005 (JP) .................................. 2005-321231

(51) Int. Cl.
*D21F 1/06* (2006.01)
(52) U.S. Cl. .................................. 162/259; 162/252
(58) Field of Classification Search .................. 162/259, 162/252, 4, 57, 189, 59, 63; 210/703; 422/128
See application file for complete search history.

(56) References Cited

U.S. PATENT DOCUMENTS

| | | | | |
|---|---|---|---|---|
| 4,872,953 A | * | 10/1989 | Smith | 162/261 |
| 5,393,417 A | * | 2/1995 | Cox | 210/96.1 |
| 6,019,947 A | * | 2/2000 | Kucherov | 422/128 |
| 7,727,355 B2 | * | 6/2010 | Goto et al. | 162/4 |
| 2007/0137804 A1 | * | 6/2007 | Goto et al. | 162/4 |
| 2008/0078518 A1 | * | 4/2008 | Goto et al. | 162/189 |
| 2010/0147479 A1 | * | 6/2010 | Goto et al. | 162/252 |

FOREIGN PATENT DOCUMENTS

| | | |
|---|---|---|
| CA | 2597401 A1 | 8/2006 |
| JP | 3-199478 A | 8/1991 |
| JP | 6-57670 A | 3/1994 |
| JP | 2006-257589 A | 9/2006 |
| WO | 95/28521 A1 | 10/1995 |
| WO | 01/87471 A2 | 11/2001 |
| WO | 2005/012632 A1 | 2/2005 |
| WO | 2006/085598 A1 | 8/2006 |

OTHER PUBLICATIONS

SMMOK, Handbook for Pulp and Paper Technologies, Chapter 9, 19992.*
International Preliminary Report on Patentability (Form PCT/IB/373) and Written Opinion of the International Searching Authority (Form PCT/ISA/237) from corresponding Patent Cooperation Treaty Application No. PCT/JP2006/321997, mailed May 15, 2008.
International Search Report from corresponding Patent Cooperation Treaty Application No. PCT/JP06/321997, dated Jan. 16, 2007.

* cited by examiner

*Primary Examiner* — Mark Halpern
(74) *Attorney, Agent, or Firm* — Gardner, Linn, Burkhart & Flory, LLP

(57) ABSTRACT

A papermaking raw material processor capable of reforming pulp in papermaking a process using cavitation includes a first pump 5 jets jet liquid and second pump 6 jets suspension containing; e.g., pulp fibers into a processing unit inside which cavitation is generated by generation of a jet stream. Inside processing unit 2, a jet stream generates cavitation to carry out a reforming processing in which ink, or the like, is removed from the fibers by a blast resulting from collapse of cavitation bubbles generated there. The liquid after reforming processing is returned to second tank 4, except for a part of it fed to downstream steps, while the suspension is processed, as circulated between processing unit 2 and second tank 6.

10 Claims, 12 Drawing Sheets

(a)        (b)

APPARATUS FOR TREATING PAPERMAKING FEEDSTOCK

CROSS REFERENCE TO RELATED APPLICATION

This application claims the priority benefits of International Application No. PCT/JP2006/321997, filed on Nov. 2, 2006, which is hereby incorporated herein by reference in its entirety.

BACKGROUND OF THE INVENTION

The present invention relates to a papermaking raw material processor adapted to reform papermaking raw materials before served to a paper machine and more particularly to an apparatus adapted to deink waste paper.

The papermaking process consists mainly of chemically processing woodchips to pulp them, followed by subjecting it to a paper machine and drying it. Before subjecting it to a paper machine, pulp is disaggregated in water, e.g., beaten to remove impurities. Incidentally, endeavors are being made, mainly for the sake of savings in resources, to recycle used paper into pulp to manufacture recycled paper. Such recycled pulp, as additive to put in the above prior step in accordance with the quality of paper to make, needs to undergo a deinking step in which printing ink on the used paper is separated and removed from pulp fiber before added in the prior step. Conventionally, such deinking process involves use, e.g., of a kneader taking advantage of friction among fibers, a disperser by means of shearing force of blade and fibers in order to detach ink from fibers, however, making troubles such as aggravated damage of fibers, reattachment of detached ink to fibers, etc., resulting in limited applications of recycled paper, such as newspapers, corrugated fiberboard, etc.

On the other hand, when applied, e.g., to mechanical paper as subjected to high degree whiteness processing, it requires chemicals, also controlling the temperature of the processing with chemicals, with the risks of complicating the deinking process or pushing up the costs. Moreover, undetachable substances, such as toner, UV resin ink, etc., used, e.g., for a copying machine are more and more mixed, with diversification of waste papers, resulting in the risks of giving more mechanical burden, e.g., on a kneader, while facing problems, such as degraded strength, dimensional stability, curls, etc., due to shortened fibers, per se, a higher content of fine fibers, twisted fibers, etc.

SUMMARY OF THE INVENTION

To cope with the above problems, the Applicant proposed to make use of a cavitation jet technique for reforming processing. With this pulp processor, cavitation bubbles are actively introduced into pulp suspension at the step of manufacturing recycle pulp from used paper in order to remove polluting substances, such as ink from pulp fibers, inorganic particles, etc., thanks to the intensive impact when the cavitation bubbles collapse.

This can improve whiteness, less damaging the fibers, without needing chemical processing or temperature control, enabling low-concentration processing with sterilization without reattachment or imprinting of detached ink.

The present invention enables the pulp processor to be installed in a pulp manufacturing process.

An aspect of the present invention relates to a papermaking raw material processor, bringing cavitation bubbles generated by cavitation into contact with papermaking raw material in suspension to process the papermaking raw material with intensive impact from collapse of the cavitation bubbles, including a processing unit to supply suspension containing the papermaking raw material and to generate cavitation; a pump to generate pressure to jet the suspension into the processing unit; a jet to jet the suspension and generate the cavitation bubbles by the jet stream; and a tank to store the suspension, and that the suspension is jetted from the pump via the jet into the processing unit to feed the papermaking raw material, processed in the processing unit, to the downstream steps or to return it to the supply tank.

In the disclosed embodiment, suspension is jetted into the processing unit from the jet in the form of a nozzle, orifice pipe, venturi tube, etc., to generate cavitation, thereby carrying out a processing, thanks to collapse of cavitation bubbles, inside the processing unit. Processed liquid discharged from the processing unit after being subjected to reforming by cavitation is fed to downstream steps, when usable as it is, or returned to the supply tank, when not sufficiently processed yet, to be jetted again to the processing unit to be further reformed. Processing at the processing unit may be repeated a sufficient number of times for papermaking raw material to be obtained in desired conditions, in accordance with the pressure to jet suspension, generation of cavitation at the processing unit, etc. Then, suspension to be used for reforming may be fed to the supply tank. Batch processing may be performed. In such batch processing, used liquid is collected after a required number of repetitions of processing at the processing unit. The feeding operation is performed on completion of processing. When it is performed, while collecting used liquid, an equivalent amount of suspension as collected is continuously fed.

Processing of papermaking raw material in the disclosed embodiment involves steps of using cavitation to generate cavitation bubbles in suspension containing papermaking raw material, bringing the cavitation bubbles into contact with papermaking raw material contained in suspension, in order to process pulp fibers.

For example, it involves steps of beating pulp fibers to achieve a desired freeness and improve the strength, preparing a hydrophilic surface of pulp fiber, external fibrillation of pulp fiber, and deinking steps of removal of hydrophobic substances, such as ink attached to the pulp, decomposition of organic coloring ingredients, etc.

On the other hand, cavitation processing may use pulps made from softwoods, hardwoods, fibers other than timber, etc., more specifically, such as chemical pulp; e.g., like kraft pulp, mechanical pulp; e.g., like groundwood pulp, thermo mechanical pulp or; e.g., recycled pulp made from waste paper; e.g., like newspaper or flyer, groundwood paper, coated paper, thermosensible paper, pressure sensitive paper, simili, colored wood free paper, electrophotographic transfer paper, computer output paper, waste paper of their mixture or any material containing cellulosic fibers.

The papermaking raw material processor may use a high-pressure pump.

It means that pump suspension is jetted with a high-pressure for the purpose of efficient generation of controllable cavitation.

The papermaking raw material processor may use discharging pressure regulating means to detect the pressure of the suspension jetted from the discharging outlet of the pump and to control the pump discharging pressure, based on the detected value.

It has means to regulate the discharging pressure of the pump in order that the pump should discharge at a pressure kept appropriate for generation of cavitation. For example, it detects the discharging pressure and sets a pressure regulator.

The papermaking raw material may bring cavitation bubbles generated by cavitation into contact with papermaking raw material in suspension to process the papermaking raw material with intensive impact from collapse of the cavitation bubbles. A processing unit may be provided to supply suspension containing the papermaking raw material and to generate cavitation; a first pump to generate pressure to jet the suspension into the processing unit; a jet, communicating with the first pump, to jet the suspension and generate the cavitation bubbles by the jet stream; a tank to store the suspension; and a second pump to circulate in the supply tank the suspension stored in the supply tank, while feeding it to the processing unit and that the suspension is jetted from the first pump via the jet into the processing unit to feed the suspension from the supply tank to the processing unit, thanks to the second pump to bring it in contact with cavitation bubbles generated inside the processing unit to feed the papermaking raw material, processed in the processing unit, to the downstream steps or to return it to the supply tank.

That is to say, suspension to reform is jetted into a processing unit and jet liquid is jetted onto the suspension in order to generate cavitation. The jet liquid can be fresh water, reused water collected during the papermaking process, pressed-pulp water, white water, pulp suspension, etc. The suspension is fed to the supply tank and the jet liquid is fed to the first pump to be jetted into the processing unit by the first pump. On the other hand, the suspension is jetted with the second pump into the processing unit. The jet liquid and the suspension collide against each other in the processing unit, while processed by the blast when the cavitation bubbles collapse.

The papermaking raw material processor may bring cavitation bubbles generated by cavitation into contact with papermaking raw material in suspension to process the papermaking raw material with intensive impact from collapse of the cavitation bubbles. A processing unit may be provided to supply suspension containing the papermaking raw material and to generate cavitation; a first supply tank to store jet liquid; a second supply tank to store the suspension; a first pump, communicating with the first supply tank at the suction inlet and with the second supply tank at the discharging outlet to generate pressure to jet the suspension into the processing unit; a jet, communicating with the first pump, to jet the suspension and generate the cavitation bubbles by the jet stream; and a second pump communicating with the second supply at the suction inlet and with the processing unit at the discharging outlet and that the jet liquid is jetted into the processing unit via the jet via the first pump, while feeding the suspension from the second pump into the processing unit to bring it in contact with cavitation bubbles generated inside the processing unit in order to feed the papermaking raw material, processed in the processing unit, to the downstream steps or to return it to the second supply tank.

In other words, it is equipped with a first supply tank for jet liquid and a second supply tank for suspension. A tank other than that for suspension was arranged for convenience of continuous supply of pressed-pulp water or white water, i.e., liquid generated during the papermaking process and temporarily in store before used, even though the jet liquid can also be, e.g., fresh water, as already explained.

The papermaking raw material processor may be switchable to put the first and second supply tanks in communication with each other or to separate them from each other.

When only the suspension is jetted into the processing unit to generate cavitation, the first and second tanks are put in communication. On the other hand, to jet the suspension and jet liquid, those first and second tanks are separated from each other to store the suspension and the jet liquid separately.

The papermaking raw material processor may bring cavitation bubbles, generated by cavitation, into contact with papermaking raw material in suspension to process the papermaking raw material with intensive impact from collapse of the cavitation bubbles. A processing unit may be provided to supply suspension containing the papermaking raw material and to generate cavitation; a first supply tank to store jet liquid; a second supply tank to store the suspension; a first pump, communicating with the first supply tank at the suction inlet and with the second supply tank at the discharging outlet to generate pressure to jet the suspension into the processing unit; a jet, communicating with the first pump, to jet the suspension and generate the cavitation bubbles by the jet stream; a second pump communicating with the second supply at the suction inlet and with the processing unit at the discharging outlet; and a piping communicating the second supply tank and the suction inlet of the second pump with a piping receiving the process raw material, thereby feeding the process raw material to the second supply tank and that the jet liquid is jetted into the processing unit via the jet via the first pump, while feeding the suspension from the second pump into the processing unit to bring it in contact with cavitation bubbles generated inside the processing unit in order to feed the papermaking raw material, processed in the processing unit, to the downstream steps or to return it to the second supply tank.

The papermaking raw material processor may bring cavitation bubbles, generated by cavitation, into contact with papermaking raw material in suspension to process the papermaking raw material with intensive impact from collapse of the cavitation bubbles. A processing unit may be provided to supply suspension containing the papermaking raw material and to generate cavitation; a first pump to generate pressure to jet the suspension into the processing unit; a jet, communicating with the first pump, to jet the suspension and generate the cavitation bubbles by the jet stream; a tank to store the suspension; and a second pump to circulate in the supply tank the suspension stored in the supply tank, and that the suspension is fed from the supply tank by the second pump to the suction inlet of the first pump to jet therefrom the suspension to the processing unit via the jet, to feed the papermaking raw material, processed in the processing unit, to the downstream steps or to return it to the supply tank.

In other words, the papermaking raw material processor may be adapted to jet suspension into the processing unit to generate cavitation, thereby performing a reforming processing, thanks to collapse of cavitation bubbles, inside this processing unit. This construction enables change of mode to process suspension, thanks to the presence of two pumps that can be actuated or stopped or work with changed duct lines.

The papermaking raw material processor may include discharging pressure regulating means to detect the pressure of the suspension jetted from the discharging outlet of the first pump and to control the pump discharging pressure based on the detected value.

Such discharging pressure regulating means has been arranged for the first pump to jet the suspension at a discharging pressure maintained appropriate to generate cavitation. For example, discharging pressure is detected to place a pressure regulator. Then, the jet liquid should preferably be jetted at a discharging pressure of 0.01 to 60 MPa, more preferably 0.5 to 30 MPa. Cavitation cannot be sufficiently generated at a discharging pressure less than 0.01 MPa, while a pressure higher than 60 MPa requires a special pump or pressure container, consuming more energy to push up costs disadvantageously, also damaging too much the pulp fibers that are not appropriately used as papermaking raw material any more.

The papermaking raw material processor may include outlet pressure regulating means to seal the processing unit, detect the outlet pressure of the processing unit, and to control the pressure inside the processing unit, based on the detected value.

The first pump may be a high-pressure pump and the second pump a fixed delivery pump.

Jet liquid is jetted with a high-pressure pump to generate cavitation, thereby jetting thus generated cavitation bubbles to the suspension jetted from a fixed delivery pump.

The processing unit may include a plurality of jets tilted so as to jet the suspension to the processing unit in a direction toward the downstream side of the processing unit, relative to the axial direction of the processing unit.

The processing unit supplies the suspension to reform on one side and discharges processed liquid on the other side, for the suspension to flow from the supplying upstream to discharging downstream. Then, the suspension is jetted in a direction tilted relative to the direction of this flow, making the suspension, jetted from the respective jets, collide inside the processing unit. This collision collapses cavitation bubbles, formed by cavitation, to act on papermaking raw material in the suspension. Cavitation is generated, as the suspension is jetted at high pressure.

The processing unit may include a plurality of jets directed so as to jet the suspension to the processing unit in a direction almost parallel with the axial direction of the processing unit.

The direction to jet the suspension is made parallel with the flowing direction inside the processing unit. The suspension hardly collides inside the processing unit, enabling smooth flow, thereby shortening the processing time inside the processing unit. Cavitation is generated, as the suspension is jetted at high pressure.

The processing unit may include a plurality of parallel jets directed in a direction almost parallel with the axial direction of the processing unit and a plurality of jets tilted so as to direct the jet stream in a direction toward the center of the processing unit.

This construction is made to bring the suspension and the jet liquid in collision to each other. For example, cavitation bubbles generated by jetting of jet liquid are brought into collision with papermaking raw material in suspension to collapse and process the cavitation bubbles.

The parallel jets may be arranged on the upstream wall body of the processing unit and the tilted jets are disposed on the sidewall of the processing unit at appropriate intervals in the direction of the jet stream.

This construction provides a plurality of points to bring the suspension and the jet liquid into collision to each other. For example, the suspension jetted from parallel jets is brought into collision with jet liquid jetted from tilted jets, a plurality of times during its flow inside the processing unit, thereby subjecting the papermaking raw material in the suspension to the blast of the collapsing cavitation bubbles generated by cavitation.

The parallel jets jet the suspension and the tilted jets jet the jet liquid.

A mode of bringing the suspension and jet liquid into collision to each other is realized by this construction in which jet liquid is jetted in a slanting direction to the suspension flowing in the direction of flow in the processing unit to bring them into collision.

The processing unit may include a plurality of parallel jets directed in a direction almost parallel with the axial direction of the processing unit, for an appropriate number of the parallel jets to jet the suspension and the rest of the jets to jet the jet liquid.

In other words, the suspension and jet liquid are jetted along the flow direction of the processing unit.

The papermaking raw material processor may bring cavitation bubbles generated by cavitation into contact with papermaking raw material in suspension to process the papermaking raw material with intensive impact from collapse of the cavitation bubbles. It may include a processing unit to supply suspension containing the papermaking raw material and to generate cavitation, the processing unit comprising: axially-directed central jet pipes, each with a nozzle, placed at the inlet of the processing unit; marginal jet pipes disposed at a plurality of points on the circumference around the axis; and surrounding wall jet pipes disposed on the surrounding wall of the processing unit, tilted relative to the axis, while directed toward downstream in the flowing direction inside the processing unit, allowing the suspension and the jet liquid to be jetted from any of the central jet pipes, marginal jet pipes or surrounding wall jet pipes at choice.

In other words, a plurality of jets different in jetting direction are arranged at a plurality of points at the processing unit, allowing choice among such jets to modify the jetting mode in accordance with the quality of papermaking raw material depending, e.g., on the kind of tree, waste paper, etc.

The papermaking raw material processor may include a plurality of surrounding wall jet pipes that are arranged at appropriate intervals on the surrounding wall of the nozzle short pipe, such nozzle short pipes are detachable from each other, allowing a given number of nozzle short pipes to be axially arranged.

It means that the number of jets disposed on the wall body of the processing unit for jetting in a slanting direction can be modified.

The papermaking raw material processor according to an embodiment of the present invention can make an efficient use of cavitation in processing inside a processing unit, enabling it to be installed in a pulp manufacturing process.

The papermaking raw material processor according to an embodiment of the invention can jet the suspension into the processing unit at a high pressure, assuring generation of cavitation.

The papermaking raw material processor according to an embodiment of the invention can jet the suspension into the processing unit at a pressure kept constant, thereby enabling constant processing.

The papermaking raw material processor according to an embodiment of the invention can efficiently bring cavitation bubbles into contact with papermaking raw material in the suspension, thanks to jet liquid jetted into the suspension inside the processing unit, thereby improving efficiency in processing.

The papermaking raw material processor according to an embodiment of the invention can store pressed-pulp water, white water, etc., discharged from the pulp manufacturing process to use it as jet liquid, in order to assure a continuous jet of jet liquid into the processing unit, thereby enabling efficient reuse of different kinds of water used and discharged during the pulp manufacturing process, as well as continuous processing on installing such papermaking raw material processor in the pulp manufacturing process.

The papermaking raw material processor according to an embodiment of the invention can generate cavitation only with the suspension or by jetting jet liquid into the suspension, on an optional basis, in order to perform processing in accordance with the quality of paper for a paper machine to make.

The papermaking raw material processor according to an embodiment of the invention can be installed in the pulp manufacturing process for efficient use of cavitation in processing in a processing unit.

The papermaking raw material processor according to an embodiment of the invention can maintain constant pressure inside the processing unit to perform constant processing.

The papermaking raw material processor according to an embodiment of the invention generates cavitation from jet liquid jetted from a high-pressure pump and collide it onto the suspension jetted from a fixed delivery pump, thereby assuring generation of cavitation and contact of generated cavitation bubbles with papermaking raw material.

The papermaking raw material processor according to an embodiment of the invention is adapted to generate cavitation by jetting the suspension, thereby realizing a processor of simple structure.

The papermaking raw material processor according to an embodiment of the invention is adapted to jet so as to collide the jet liquid onto the suspension, thereby facilitating for cavitation bubbles generated by a jet of jet liquid to get into contact with papermaking raw material in suspension to improve efficiency in processing.

The papermaking raw material processor according to an embodiment of the invention can generate cavitation effects with a plurality of repetitions, going through the processing unit, thereby, e.g., assuring removal of ink, or the like, from papermaking material after a plurality of repetitions of processing.

The papermaking raw material processor according to an embodiment of the invention can bring the suspension into contact with cavitation bubbles with a plurality of repetitions, thereby, e.g., assuring removal of ink, or the like, from papermaking material after a plurality of repetitions of processing.

The papermaking raw material processor according to an embodiment of the invention can lengthen the time to keep the suspension and the jet liquid in contact with each other, thereby subjecting the papermaking raw material to sufficient reforming processing.

The papermaking raw material processor according to an embodiment of the invention can jet the suspension or the jet liquid from a jet chosen in accordance with the quality of the papermaking raw material in order to realize the best processing.

The papermaking raw material processor can change the number of jets to use in accordance with the amount of suspension to process, enabling optimum arrangement in papermaking process.

DETAILED DESCRIPTION OF THE PREFERRED EMBODIMENT

Now, the papermaking raw material processor will be explained more specifically, referring to an illustrated preferred embodiment.

Figure 1:
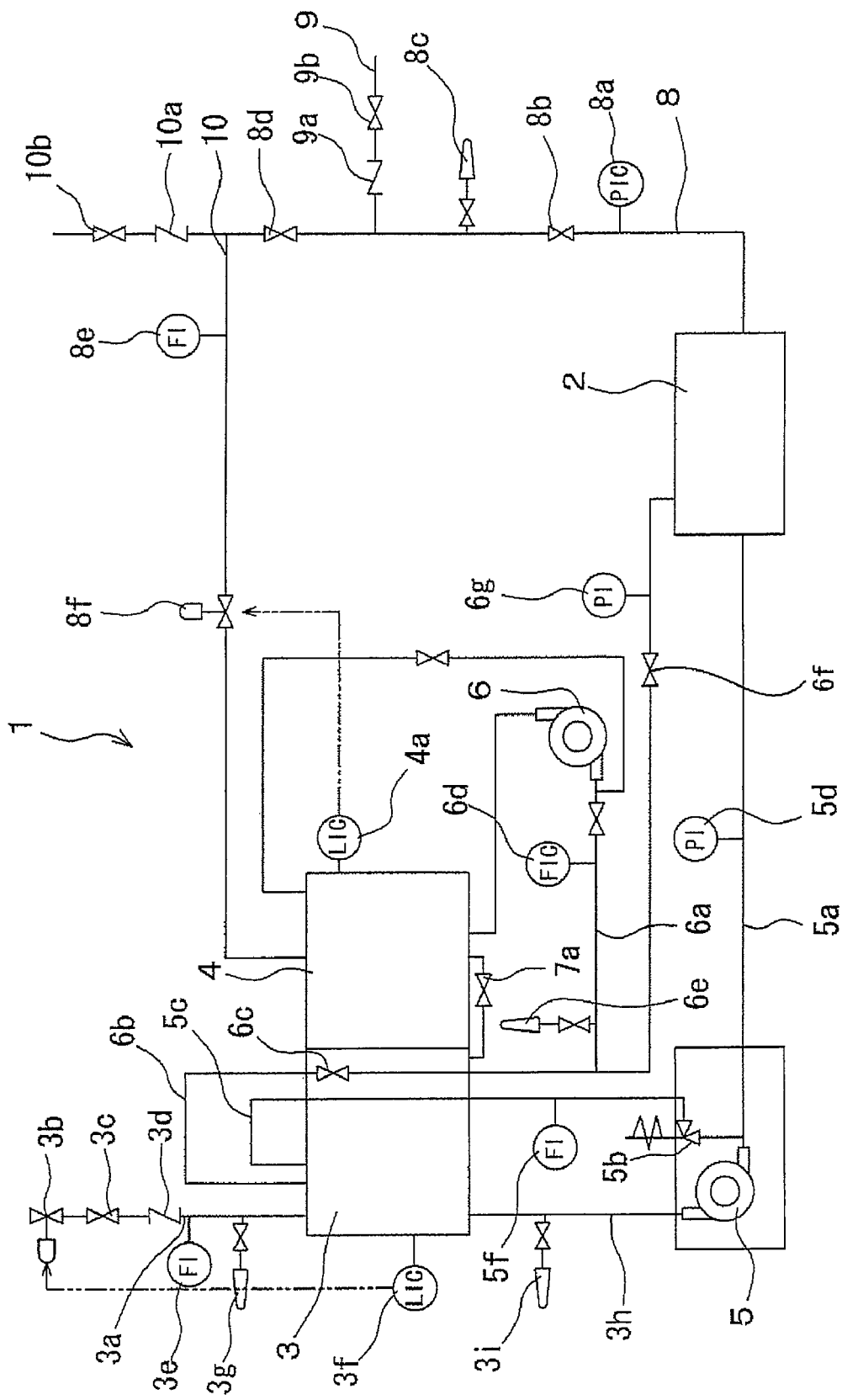
FIG. 1 shows the construction of a papermaking raw material processor, according to the first embodiment of the present invention, adapted to inject and process the suspension and injection liquid.

FIG. 1 shows the first embodiment of this papermaking raw material processor 1. This papermaking raw material processor 1 comprises mainly processing unit 2, first tank 3, and second tank 4, first pump 5 and second pump 6. First tank 3 is supplied from piping 3a by an unillustrated pulper with the suspension in which pulp or used paper is disaggregated. This piping 3a has, on its way, variably opened liquid-level regulating valve 3b, open/close valve 3c, check valve 3d and flow meter 3e. First tank 3 has liquid-level detecting/regulating meter 3f, which detects the liquid level in first tank 3, opens or closes liquid-level regulating valve 3b, in accordance with the detected liquid level to regulate the flow, thereby keeping the liquid level constant. Piping 3a has, on its way, intake 3g to sample the suspension.

First tank 3 communicates with the suction side of first pump 5, as introduced by inlet piping 3h. This first pump 5 is a plunger-type high-pressure pump. This first pump 5 should preferably have a discharge pressure of 0.5 MPa or more, keeping the inlet pressure at processing unit 2 more than 0.5 MPa, to prevent the efficiency in generation of cavitation bubbles from lowering. Inlet piping 3h has, on its way, intake 3i for sampling. First pump 5 communicates, on its discharging side, with the inlet of processing unit 2 via inlet piping 5a. On the other hand, first pump 5 has, on its discharging side, pressure regulating valve 5b which is opened, when first pump 5 discharges at a pressure higher than preset, to return a part of discharge to first tank 3 via piping 5c. Piping 5c has, on its way, flow meter 5f, while inlet-piping 5a has, on its way, manometer 5d.

The second pump 6 communicates, on its suction side, with the second tank. This second pump 6 is a constant-volume pump. This second pump 6 communicates, on its discharging side, with the inlet of the processing unit 2 via piping 6a. This piping 6a has, on its way, branch pipe 6b for first tank 3 to be supplied with discharged liquid via open/close valve 6c. Piping 6a is equipped with flow meter 6d, intake 6e, open/close valve 6f and manometer 6g. First tank 3 and second tank 4 are connected with each other by communication piping 7 having, on its way, open/close valve 7a that can be opened to enable communication.

Processing unit 2 is connected, at its outlet, with outlet piping 8 via which the liquid is returned to second tank 4, after reformed through processing unit 2. Outlet piping 8 is equipped with, in the order of the flow, manometer 8a, open/close valve 8b, intake 8c, open/close valve 8d, flow meter 8e and liquid-level regulating valve 8f. Branch point 9 is connected at the middle point position between intake 8c and open/close valve 8d and equipped with check valve 9a and open/close valve 9b via which processed liquid is fed to downstream. Branch pipe 10 equipped with check valve 10a and open/close valve 10b is connected between open/close valve 8d and flow meter 8e, in order that the suspension to process or injection liquid is fed to tank 4 via branch pipe 10. Second tank 4 has a liquid-level detecting/regulating meter 4a, which detects the liquid level in second tank 4, opens or closes liquid-level regulating valve 8f, in accordance with the detected liquid level to regulate the flow, thereby keeping the liquid level constant in second tank 4.

Now, the second embodiment of the present invention will be explained, referring to FIG. 1. First tank 3 stores injection liquid to be used to generate cavitation bubbles, while second tank 4 stores the suspension that carries papermaking raw materials to process. Injection liquid should preferably be, e.g., fresh water, pressed-pulp water, white water, etc., having a lower solid pulp fiber content than suspension to process. Injection liquid is fed to first tank 3 via piping 3a, while the suspension to process is fed to second tank 4 via branch pipe 10. First tank 3 and second tank 4, used with open/close valve 7a closed in FIG. 1, may be totally separate from each other.

Figure 2:
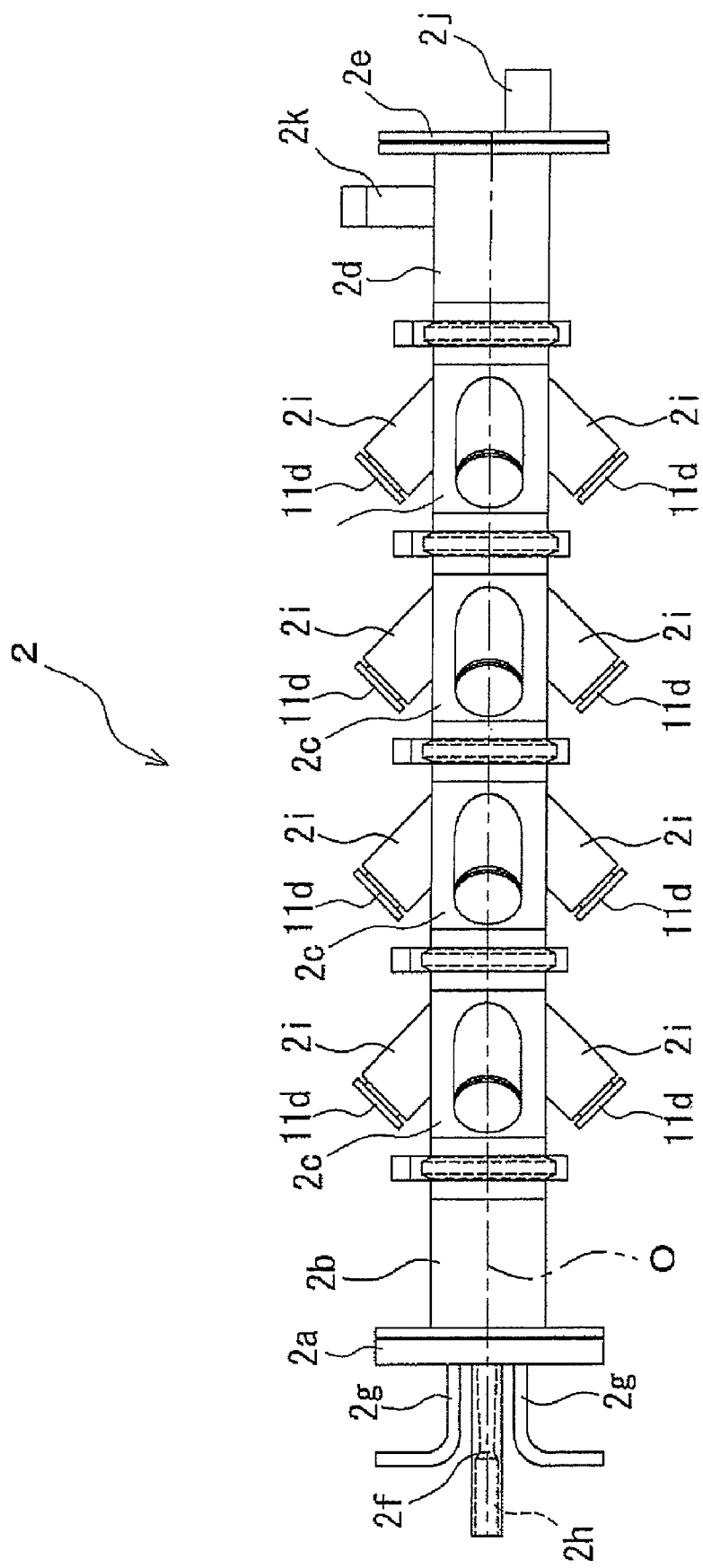
FIG. 2 is a side-view of a processing unit of the present invention.
Figure 3:
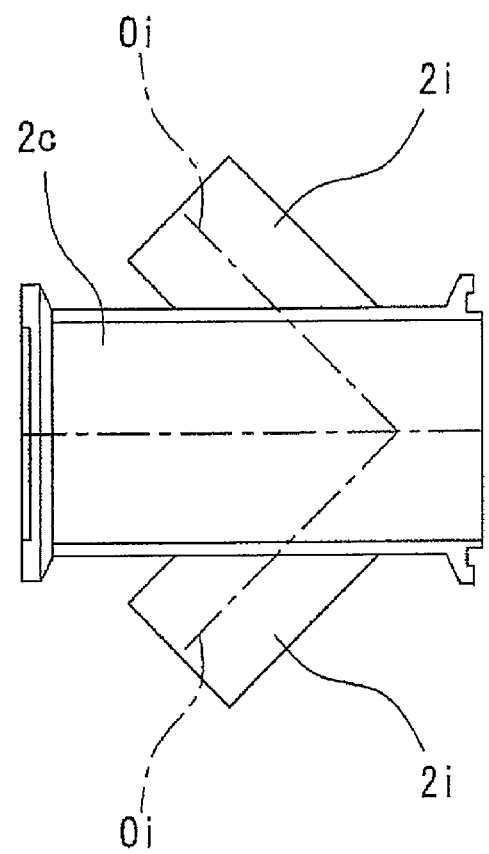
FIG. 3 is a side-view of a short pipe with a nozzle that forms the processing unit.
Figure 4:
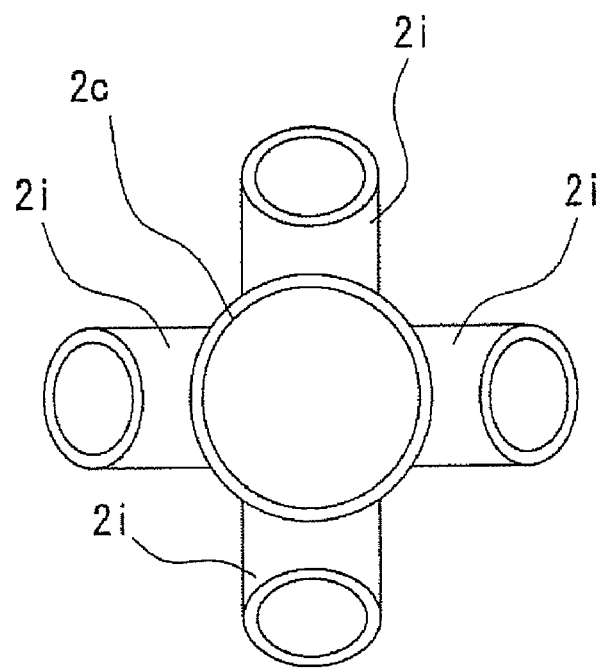
FIG. 4 is a front view of the short pipe with the nozzle as shown in FIG. 3.

FIGS. 2 to 4 are diagrammatic sketches of the structure of processing unit 2. In FIG. 2, the inlet is shown on the left. This processing unit 2 comprises, in the order presented from the inlet on the left to the right, inlet flange 2a, inlet short pipe 2b, a plurality of nozzle short pipes 2c i.e. jet short pipes, outlet short pipe 2d, outlet flange 2e, detachably connected to one another.

Inlet flange 2a has, at its center, central nozzle pipe 2f, i.e., parallel jet, and a plurality of marginal nozzle pipes 2g, i.e., parallel jets there around. These central nozzle pipe 2f and marginal nozzle pipes 2g are all directed with their tips from the inlet (upstream) toward the outlet (downstream) of processing unit 2, i.e., in parallel with the direction of axis O of processing unit 2 toward the outlet. Then, central nozzle pipe 2f has a venturi tube 2h that may be replaced with an orifice. To this inlet flange 2a, inlet short pipe 2b is connected via a flange.

To inlet short tube 2b, nozzle short tube 2c is connected via a flange. Nozzle short pipe 2c has, at four parts around itself, as shown in FIGS. 3 and 4, surrounding wall nozzle pipes 2i serving as jets tilted toward axis O. These surrounding wall nozzle pipes 2i are tilted in such a way that joints with nozzle short pipes 2c are located on the downstream side of processing unit 2, while axes Oi of these surrounding wall nozzle pipes 2i intersect one another at points almost on the axis O. A plurality of such nozzle short pipes 2c are connected to one another via flange to connect outlet short pipe 2d on the downstream side with a flange. In this embodiment, four nozzle short pipes 2c are connected, but the number of nozzle short pipes can be greater or smaller as needed by the specification of the reforming processing.

The above outlet short pipe 2d has ventilation pipe 2k to evacuate air held up inside processing unit 2. In this embodiment, processing unit 2 is placed with its axis O kept more or less horizontal, requiring the presence of ventilation pipe 2k. However, ventilation pipe 2k is not needed when the axis O is kept almost vertical.

Outlet flange 2e has, in an eccentric position, outlet pipe 2j, from which the suspension carrying, e.g., pulp is evacuated after reformed going through processing unit 2.

As will be explained later, processing unit 2 may have inside itself an unillustrated baffle plate to intercept a jet from the nozzle. This baffle plate should preferably be set to provide to the inner wall face of processing unit 2 a gap in the order of 1 to 5 mm, enabling generation of cavitation by a jet from the nozzle, to generate second cavitation by going through the gap.

Figure 5:
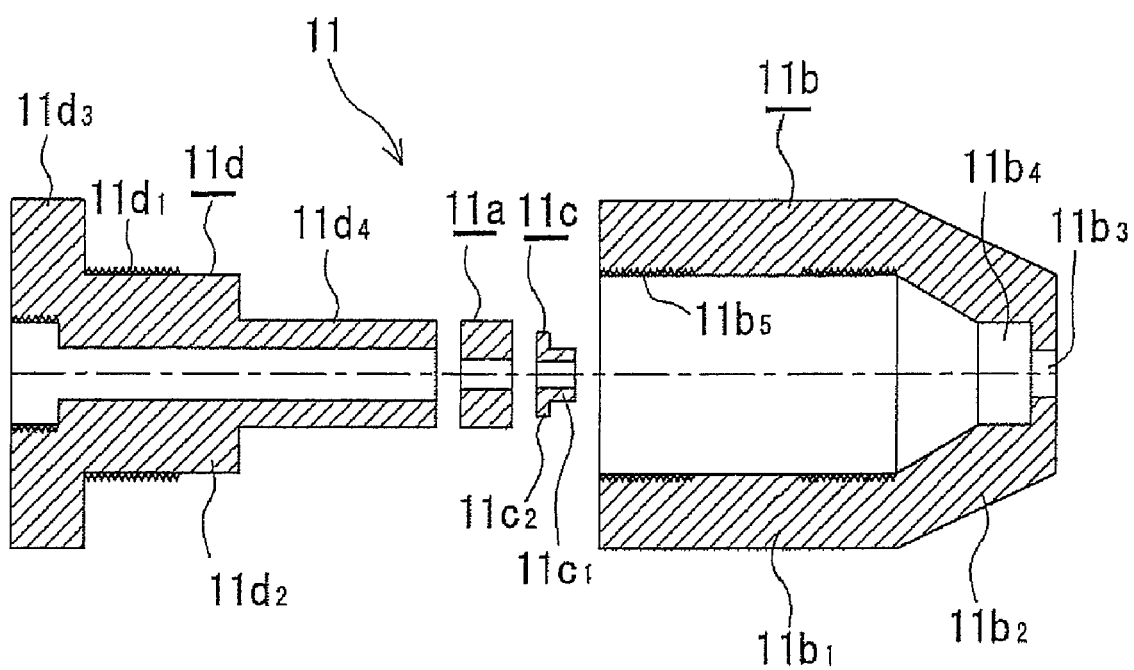
FIG. 5 is an exploded cross-sectional view to show the construction of the nozzle.

FIG. 5 shows nozzle 11 i.e. a jet to be attached to the surrounding wall nozzle pipe 2i, comprising nozzle tip 11a, tip holder 11b to hold nozzle tip 11a, spacer 11c to adjust the position of nozzle tip 11a within nozzle holder 11b and tip clamp 11d to fix nozzle tip 11a and spacer 11c within nozzle holder 11b. Nozzle tip 11a is made of stainless, for example, or abrasion proof material, in the form of a cylinder. Spacer 11c is placed before nozzle tip 11a. This spacer 11a comprises cylindrical main body $11c_1$ and seat $11c_2$ having a diameter that is greater and greater backward. The tip holder 11b comprises cylindrical main body $11b_1$ and frustum-shaped drawn part $11b_2$ formed on the tip side of the main body $11b_1$. This drawn part $11b_2$ has at its own tip, inside itself, spacer receptor $11b_3$ to receive main body $11c_1$ of the spacer 11c, while this spacer receptor $11b_3$ has at its back tip receptor $11b_4$ to receive the nozzle tip 11a. Main body $11b_1$ has on its rear inner side-surface, inside itself, female-threaded part $11b_5$. The tip clamp 11d comprises: main body $11d_2$ having a male-threaded part $11d_1$ to fit the female-threaded part $11b_5$; seat $11d_3$ formed at the back of the main body $11d_2$ to have a diameter greater than the main body $11d_2$; and clamp $11d_4$ formed at front of main body $11d_2$ to have a smaller diameter almost equal to the outer diameter of the nozzle tip 11a. Main body $11d_2$ has at rear, inside itself, female-threaded part $11d5$ to connect piping. It may have a structure for this nozzle 11 to be inserted into the surrounding wall nozzle pipe 2i or the tip holder 11b also can be a surrounding wall nozzle pipe 2i in itself. In the present embodiment, it takes, as shown in FIG. 2, a structure in which surrounding wall nozzle pipe 2i is used as nozzle holder 11b.

To jet the suspension of pulp fibers, nozzle tip 11a should preferably have an inner diameter of 0.5 to 5.0 mm. An inner diameter smaller than 0.5 mm tends to congest with pulp fibers, also requiring processing at lower concentration to take a longer time to process unit raw material and to consume more electric power. On the other hand, if greater than 5.0 mm, it lowers the efficiency in generation of cavitation, with the risk of failing to achieve the desired efficiency in reforming processing. The inner shape of nozzle tip 11a is not necessarily required to be circular. Nozzle tip 11a should preferably have a wall thickness of 1.5 mm to about three times greater than the inner diameter. If smaller than 1.5 mm, it threatens the strength against the high-pressure supply of suspension.

For quick maintenance, it should preferably have a structure, like this embodiment, in which nozzle tip 11a is replaceable when worn out.

In both of the first and second embodiments of papermaking raw material processors 1 and 20, respectively, first pump 5 has inlet piping 5a, on the discharge side, connected with marginal nozzle pipe 2g and surrounding wall nozzle pipe 2i, with open/close valves 31, 32a, 32b, 32c, 32d set on the respective duct lines, allowing adjustment of connection with the discharging outlet of first pump 5. On the other hand, second pump 6 is connected, at its discharging outlet, with central nozzle pipe 2f.

Explanation will be made about the working of the papermaking raw material processor according to the mode of realization of the present invention constructed as above.

Figure 6:
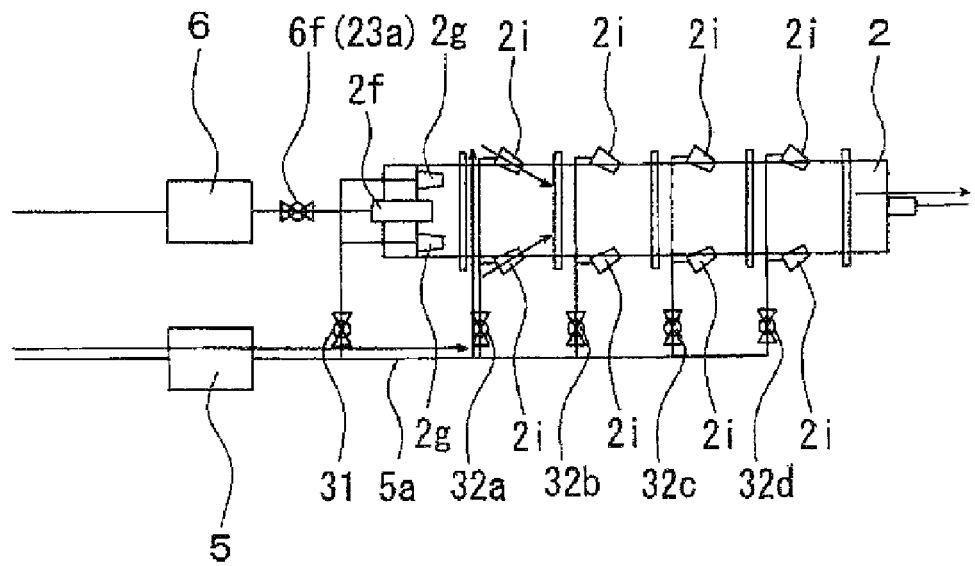
FIG. 6 explains a way in which only the suspension is injected at the processing unit to reform it.
Figure 7:
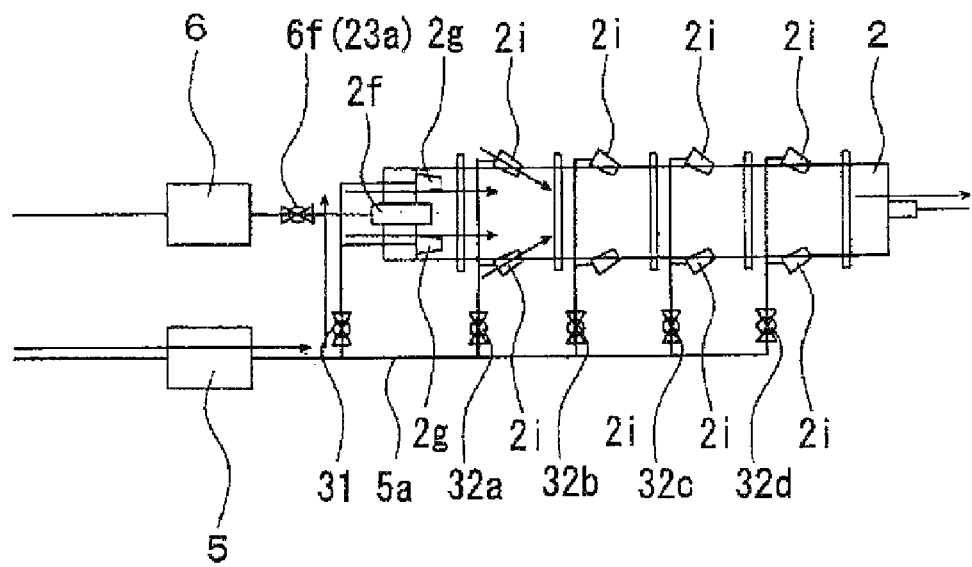
FIG. 7 explains another way in which only the suspension is injected at the processing unit to reform it.

FIGS. 6 to 9 show a system to feed the suspension to processing unit 2. FIGS. 6 and 7 shows the case when only the suspension is jetted into processing unit 2 from first pump 5, i.e., a high-pressure pump, without jetting from second pump 4.

In the case as shown in FIG. 6, the suspension is jetted from surrounding nozzle pipes 2i disposed at nozzle short pipe 2c on the upstream side of the processing unit 2, among the nozzle short pipes 2i. Such surrounding nozzle pipes 2i are arranged as tilted relative to axis O to bring the jetted suspension into collision inside processing unit 2.

In the case as shown in FIG. 7, the suspension is jetted from the marginal nozzle pipes 2g. Such surrounding nozzle pipes 2g are adapted to jet the suspension in a direction in parallel with axis O to make the jetted suspension flow along axis O inside processing unit 2.

Figure 8:
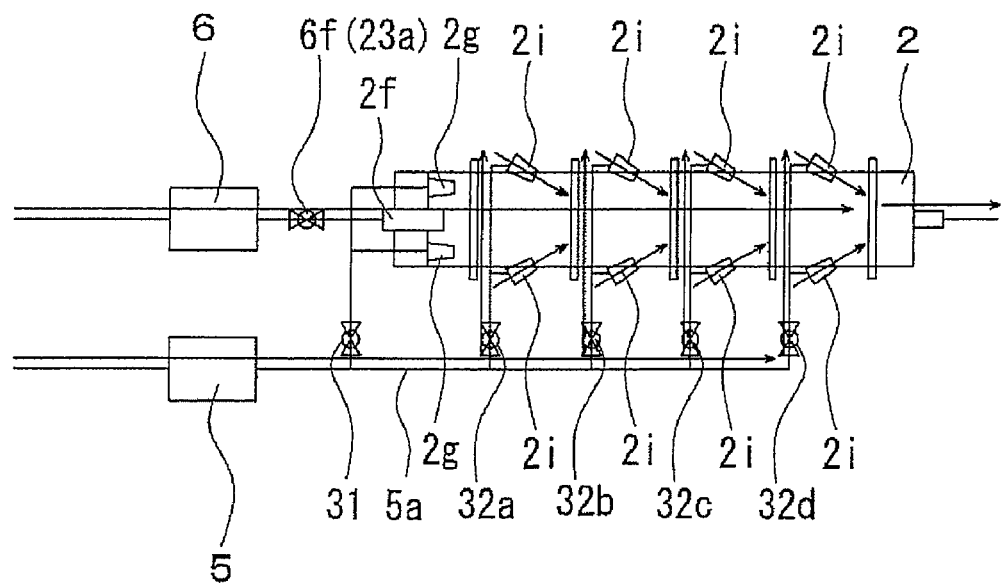
FIG. 8 explains a way in which the suspension and injection liquid are injected at the processing unit to reform them.

In the case as shown in FIG. 8, a plurality of surrounding wall nozzle pipes 2i are connected with first pump 5, while central nozzle pipe 2f is connected with second pump 6, to discharge the suspension from second pump 6 and to discharge jet liquid from first pump 5. In this case, liquid jetted from surrounding wall nozzle pipes 2i intersects and collides with the suspension jetted in a direction toward axis O from the central nozzle pipe.

Figure 9:
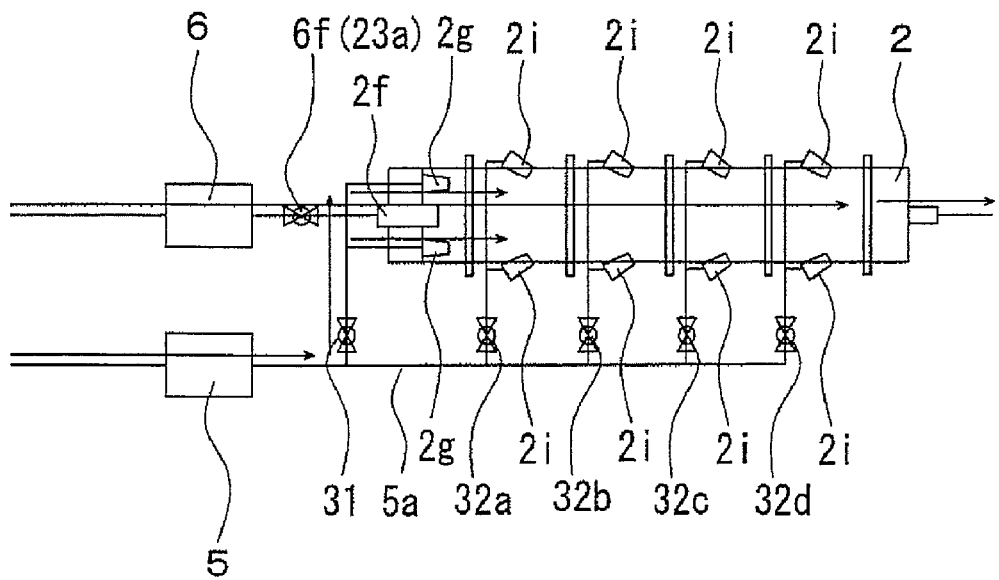
FIG. 9 explains another way in which the suspension and injection liquid are injected at the processing unit to reform them.

In the case as shown in FIG. 9, central nozzle pipe 2f is connected with second pump 6, while marginal nozzle pipes 2g are connected with first pump 5, to discharge jet liquid from first pump 5 and to discharge the suspension from second pump 6, thereby jetting the suspension from central nozzle pipe 2f and jet liquid from marginal nozzle pipes 2g, both in a direction along axis O.

In the case of batch processing in forming duct lines as shown in FIGS. 6 and 7, papermaking raw material processor 20 according to the second embodiment closes the open/close valve 23a and blocks up branch pipe 23 to shut off between processing unit 2 and second tank 4, while closing open/close valve 3c and opening open/close valve 21d at the same time, thereby connecting second tank 4 and first pump 5. In addition, the open/close valve 9b is closed to shut down piping 9 to downstream operations. Then, in the case as shown in FIG. 6, open/close valve 31 is closed to shut off between marginal nozzle pipe 2g and first pump 5, open/close valve 32b, 32c, 32d are closed, while opening open/close valve 32a, thereby putting in communication only the upstream-side surrounding wall nozzle pipes 2i and first pump 5. In the case as shown in FIG. 7, open/close valves 32a, 32b, 32c, 32d are closed to shut off between surrounding wall nozzle pipes 2i and first pump 5, open/close valve 31 is opened, thereby putting in communication first pump 5 and marginal nozzle pipes 2g. As a result, the suspension stored in second tank 4 is fed from second pump 6 to first pump 5 to be jetted from this first pump 5 into processing unit 2. As this first pump 5 is a high-pressure pump, cavitation is generated by the suspension jetted into processing unit 2, followed by processing of papermaking raw material by collapse of the cavitation bubbles.

The suspension, processed going through processing unit 2, is returned to second tank 4 through outlet piping 8. Consequently, the suspension stored in second tank 4 is circulated between this second tank 4 and processing unit 2 to be processed each time going through processing unit 2. As the suspension has been appropriately reformed, open/close valve 9b is opened, while closing open/close valve 8d, in order to feed processed liquid from piping 9 to downstream operations.

In the case of forming duct lines as shown in FIGS. 6 and 7 to perform continuous processing, open/close valve 3c, closed in the above explained batch processing, is opened to feed the suspension from piping 3a in papermaking raw material processor 20 according to the second embodiment, while open/close valve 9b opened to feed processed liquid to downstream operations. The suspension fed from piping 3a to first pump 5 is mixed with the suspension stored in second tank 4 through piping 21 to be fed to first pump 5 and jetted into processing unit 2. Cavitation is generated inside processing unit 2 to be reformed, while processed liquid goes through outlet piping 8 to be partly fed to downstream operations from piping 9, returning the rest to second tank 4. Consequently, piping 3a feeds almost as much suspension as processed liquid to be fed to downstream operations.

In the case of forming duct lines as shown in FIGS. 6 and 7 to perform batch processing, the open/close valve 7a is opened to put first tank 3 and second tank 4 in communication with each other in papermaking raw material processor 1 according to the first embodiment. The open/close valve 3c is closed to shut off the supply of the suspension from outside. The open/close valve 6f is closed to interrupt piping 6a from second pump 6 to processing unit 2, while open/close valve 6c is opened to feed the suspension discharged from second pump 6 to first tank 3. Then, open/close valves 9b and 10b are closed to interrupt piping 9 and piping 10 respectively to stop supply to downstream operations. As this being the case, first and second tanks 3 and 4 function as a single tank, thereby constituting a closed system where a circulation path is formed with processing unit 2. Consequently, once first pump 5 is actuated, the suspension fed from first tank 3 is returned to second tank 4 after reformed at processing unit 2. Then, processed liquid, appropriately reformed, is fed to downstream operations, with open/close valves 9b and 10b opened.

In the case of papermaking raw material processor 20, according to the second embodiment, forming duct lines as shown in FIGS. 8 and 9, the open/close valve 3c is opened to feed jet liquid from piping 3a to first pump 5. Then, open/close valve 21d is closed to shut off between piping 3a and second tank 4, while open/close valve 23a is opened to put in communication the discharging outlet of second pump 6 and processing unit 2. In the case as shown in FIG. 8, open/close valve 31 is closed, while open/close valves 32a, 32b, 32c, 32d are opened to communicate the discharging outlet of first pump 5 with surrounding wall nozzle pipes 2i. In this way, once first and second pumps 5 and 6 are actuated, the suspension within second tank 4 is jetted into processing unit 2 from central nozzle pipe 2f by second pump 6, while jet liquid is jetted from surrounding wall pipes 2i toward axis O of processing unit 2, thereby bringing jet liquid in collision to suspension. Liquid processed through processing unit 2 goes through outlet piping 8 to be partly fed to downstream operations from piping 9, while the rest is returned to second tank 4. On the other hand, in the case as shown in FIG. 9, open/close valve 31 is opened, while open/close valves 32a, 32b, 32c, 32d are closed, for jet liquid to be jetted into processing unit 2 from marginal nozzle pipes 2g, thereby generating a jet stream inside processing unit 2 along axis O together with the suspension jetted from central nozzle pipe 2f. Liquid processed in processing unit 2 goes through outlet piping 8 to be partly fed to downstream operations from piping 9, while the rest is returned to second tank 4.

In the case of papermaking raw material processor 1 according to the first embodiment, forming duct lines as shown in FIGS. 8 and 9, open/close valves 7a and 6c are closed to shut off between first and second tanks 3 and 4, while open/close valve 6f is opened to put in communication second pump 6 and processing unit 2. First tank 3 is supplied with jet liquid from piping 3a. As this being the case, once first and second pumps 5 and 6 are actuated, jet liquid is jetted from first pump 5 to processing unit 2, while the suspension is jetted from second pump 6. Processed liquid reformed in processing unit 2 goes through outlet piping 8 to be partly fed to downstream operations from piping 9 and piping 10, while the rest is returned to second tank 4. In the case as shown in FIG. 8, open/close valve 31 is closed, while open/close valves 32a, 32b, 32c, 32d are opened. In the case as shown in FIG. 9, open/close valve 31 is opened, while open/close valves 32a, 32b, 32c, 32d are closed. In this case, the suspension containing papermaking raw material is used as jet liquid to feed the suspension to this papermaking raw material processor 20.

As a result of the schemes as shown in FIGS. 7 and 8, recycled pulp suspension is reformed in processing unit 2 that processes 5 m³/min at a maximum pressure of 7 MPa, using nozzle tips 11a having an inner diameter of 2 mm. Both schemes enable constant control of cavitation during operation, successfully processing the suspension having a pulp concentration of 3.2%. Recycled pulp was deinked effectively, preventing reattachment of the ink, while needing no additive. Adherent or other foreign matters were reduced in terms of their grain's average area and diameter, number of pieces and their total area contained in a certain amount of raw material. Moreover, this effect has proved to be reinforced each time batch processing is performed.

Figure 10:
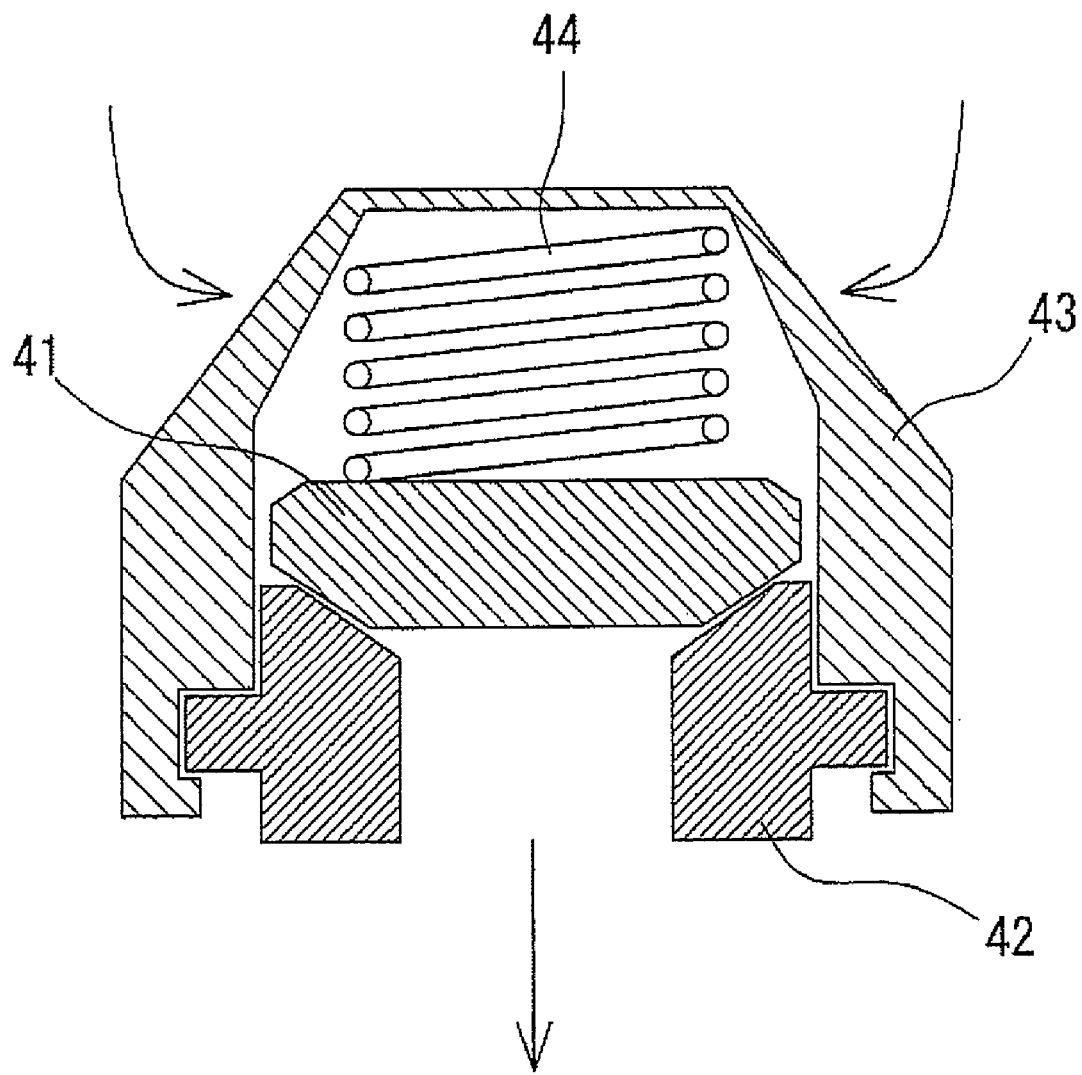
FIG. 10 explains the structure of the valve on the suction side of the high-pressure pump of the present invention.

In the case of intimate contact between a valve and a valve seat placed at a suction inlet, the close contact must be assured, since the first pump 5 is a high-pressure pump. However, when this first pump 5 is supplied with the suspension containing pulps, pulp fibers may be attached to the driving coil spring or even entangled there. FIG. 10 shows the valve structure used for the suction inlet of this type of high-pressure pump, where valve 41 and valve seat 42 are housed in casing 43. This valve 41 and valve seat 42 are separated from each other at the time of suction, while they get in close contact at the time of discharge, as assured by pressure spring 44 formed of coil spring. Once pulp fibers are entangled with this pressure spring 44, the close contact between valve 41 and valve seat 42 may not be assured. For that reason, pressure spring 44 should have a wire diameter greater than that of pulp fibers to let pulp fibers run along the circumferential surface of wire elements of pressure spring 44, thereby preventing entanglement. Advantageously, wire elements used for pressure spring 44 should have an outer circumference two times or longer than the length of pulp fibers to process. Otherwise, this pressure spring 44 should preferably be removed, for no fibers to be entangled anywhere. Moreover, valve 41 and valve seat 42 should be sealed as widely as possible, while valve 41 should have a diameter as great as possible, in order to assure close contact even despite pulp fibers, if any, entangled between valve 41 and valve seat 42.

Nozzle 11 may also be clogged up with pulp fibers contained in suspension, jammed in nozzle tip 11a having a small inner diameter, requiring removal of the pulp fibers from nozzle tip 11a. Then, the nozzle should be shaped to prevent pulp fibers from being jammed.

Figure 11:
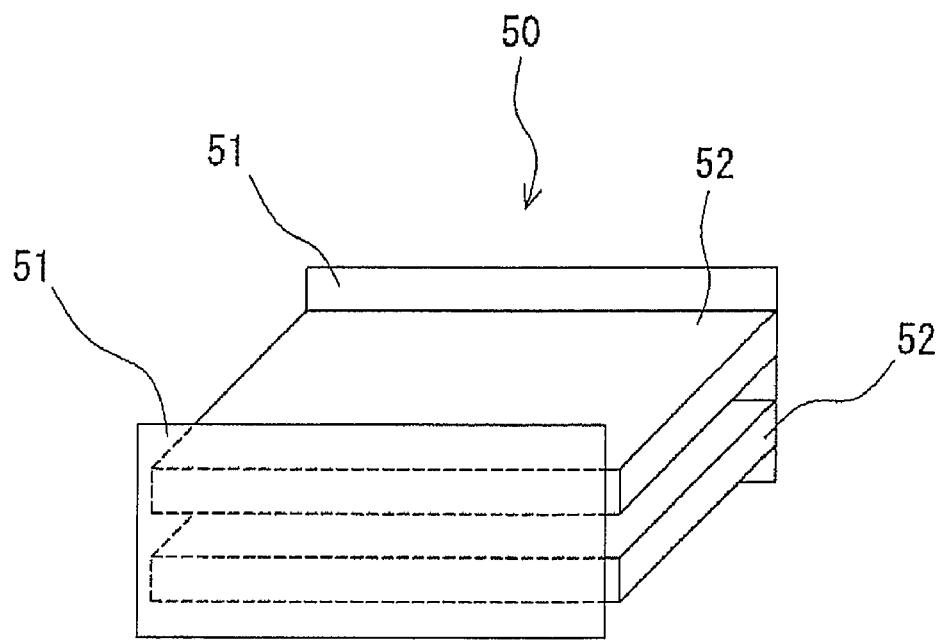
FIG. 11 shows a form of the nozzle attached to the processing unit of the present invention.
Figure 12:
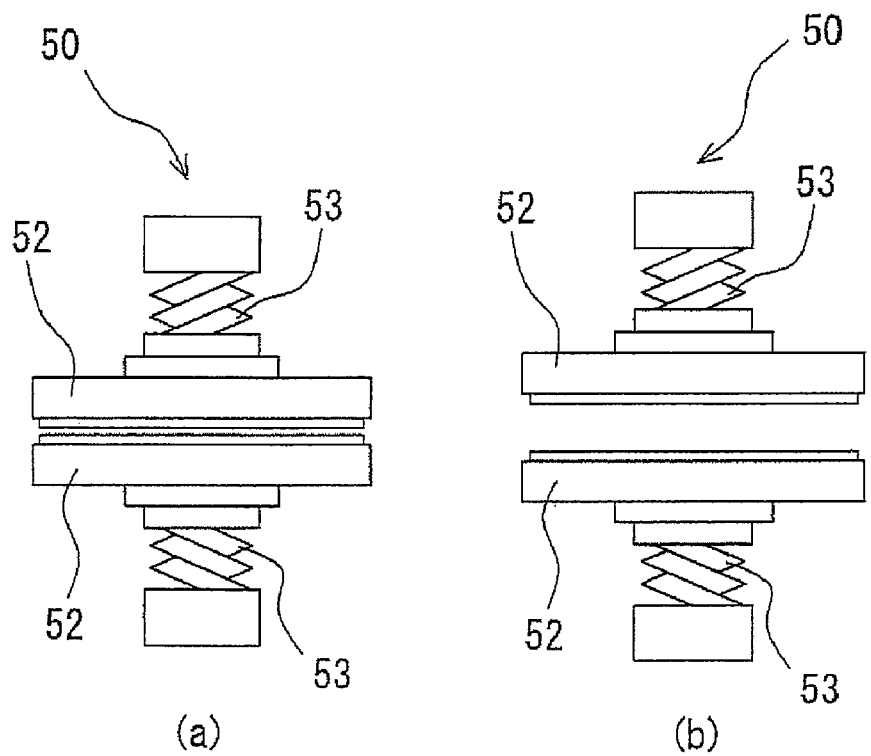
FIG. 12 shows another form of the nozzle attached to the processing unit of the present invention.
Figure 13:
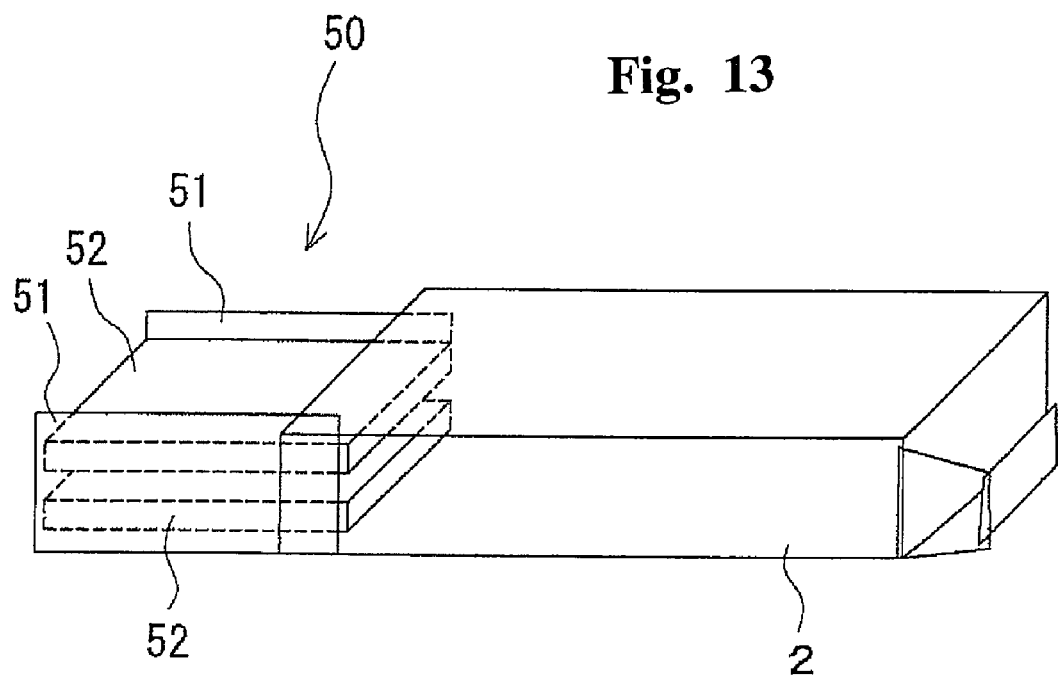
FIG. 13 shows a different form of the nozzle attached to the processing unit of the present invention.
Figure 14:
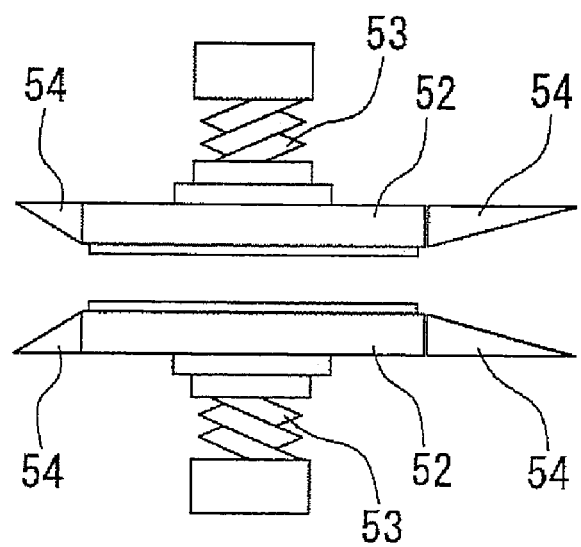
FIG. 14 shows another different form of the nozzle attached to the processing unit of the present invention.
Figure 15:
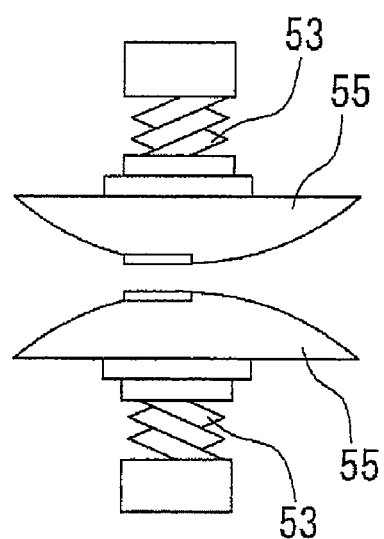
FIG. 15 shows further another different form of the nozzle attached to the processing unit of the present invention.

For example, as shown in FIG. 11, nozzle plates 52 are placed at variable intervals between a pair of sidewalls 51, allowing variation of the opening area of nozzle 50, while enabling removal of pulp fibers, if any jammed, by moving a nozzle plate 52 relative to sidewall 51. As shown in FIG. 12 (a), pressure should preferably be applied on nozzle plates 52 with pressure spring 53 in order that nozzle plates 52 are urged, by internal pressure elevated by the presence of jammed pulp fibers, to be separated from each other, against the restoring force of pressure spring 53, as shown in FIG. 12 (b), to avoid the necessity of operations to remove jammed pulp fibers. FIG. 13 shows processing unit 2 having a construction shaped to have a rectangular section, in which nozzle plates 52 are placed between walls opposed to each other at the inlet of this processing unit 2. Consequently, it can be almost as effective as a construction with a plurality of nozzles continuously arranged. As shown in FIG. 14, nozzle plates 52 should also preferably have guide plates 53 and 54 before and after themselves to enable smooth passage of the suspension and jet liquid through the nozzle. Moreover, as shown in FIG. 15, a pair of nozzle plates 55 may have faces parallel to each other for passage of fibers, while appropriately curved before and after the flat faces, for smooth passage of the suspension and jet liquid. Nozzle plates 52 should preferably be placed at intervals of 0.3 to 10 mm, more preferably 0.8 to 5 mm. If less than 0.3 mm, pulp fibers are easily jammed, while if more than 10 mm, it will need a bigger pump to maintain the pressure.

Then, parallel faces opposed to each other, where fibers go through should preferably have dimensions on the order of three times larger than such intervals.

Now, referring to diagrammatic sketches as shown in FIGS. 16 to 19, it will be explained how to adjust processing pressure of this papermaking raw material processor. The same parts of the embodiment as indicated in the above FIG. 1 are denoted with identical references.

Figure 16:
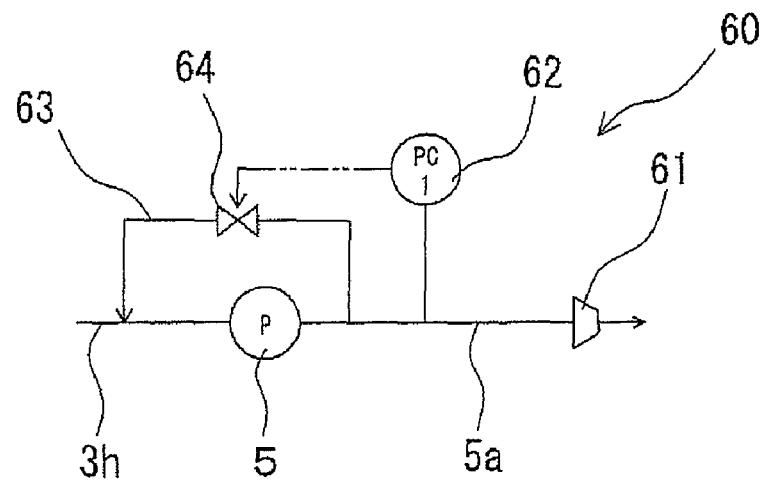
FIG. 16 schematically explains the mode of pressure regulation in the papermaking raw material processor of the present invention, showing the surroundings of the pump.

FIG. 16 shows a structure equipped with discharging pressure regulating means 60 to regulate discharging pressure of first pump 5 which has nozzle 61 at its discharging outlet to jet suspension or jet liquid to generate cavitation bubbles. This nozzle 61 is attached to any of nozzle pipes 2f, 2g, 2i already explained by FIGS. 6 to 9, optionally chosen to jet suspension or jet liquid or depending on the position to jet it. Discharging pressure is detected by pressure detector 62 placed at inlet piping 5a at the discharging outlet of first pump 5. Inlet piping 5a branches off in midstream to have return pipe 63, connected to inlet piping 3h at the suction inlet of first pump 5, while this return pipe 63 has in its midstream regulating valve 64. In other words, this return pipe 63 can return to the suction inlet liquid discharged from first pump 5, as regulated by the degree of opening of regulating valve 64, thereby enabling first pump 5 to keep the discharging pressure more or less constant. On the other hand, regulating valve 64 is opened or closed in accordance with pressure detected by pressure detector 62. Incidentally, an operator may open or close regulating valve 64 each time he or she checks pressure detected by pressure detector 62.

Figure 17:
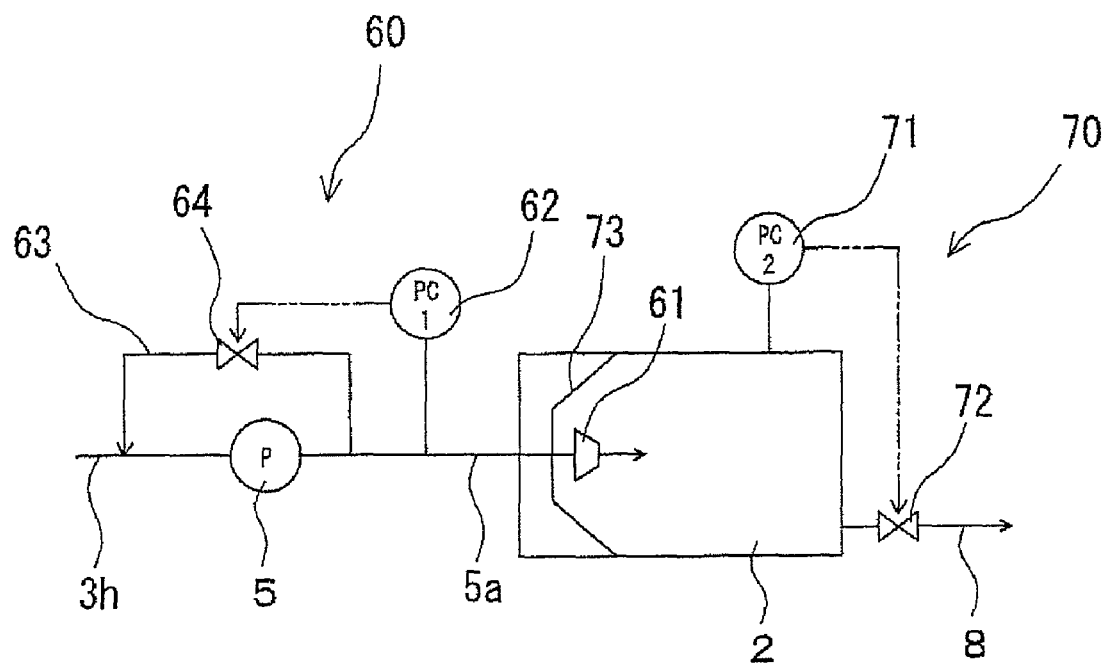
FIG. 17 schematically explains the mode of pressure regulation in the papermaking raw material processor of the present invention, showing the surroundings of the pump and the processing unit.

FIG. 17 shows a structure in which processing unit 2 has outlet pressure control means 70, also having discharging pressure regulating means 60 shown in FIG. 16. Processing unit 2 is kept tight, having internal pressure detector 71 to detect inner pressure, while regulating valve 72 placed at outlet piping 8 of processing unit 2 is opened or closed in accordance with pressure detected by internal pressure detector 71. In other words, the discharging amount from processing unit 2 is regulated by the degree of opening of regulating valve 72, thereby enabling processing unit 2 to keep its internal pressure more or less constant. Incidentally, an operator may open or close regulating valve 72 each time he or she checks pressure detected by internal pressure detector 71. A straightening vane 73 should also preferably be placed to minimize the variance of pressure inside processing unit 2.

Figure 18:
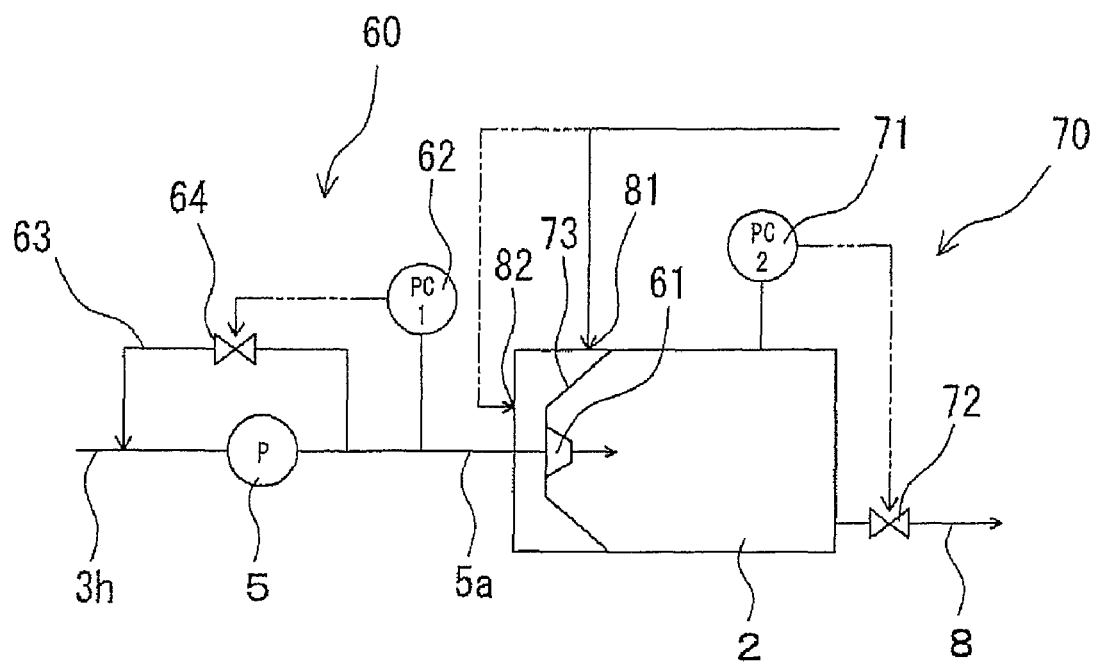
FIG. 18 schematically explains the mode of pressure regulation in the papermaking raw material processor of the present invention, showing the surroundings of the pump and the processing unit, together with a plurality of distribution channels to the processing unit.

On the other hand, as shown in FIG. 18, processing unit 2 may have supply ports 81, 82 just for supply, unlike nozzle 61 to jet liquid. In FIG. 18, the same parts as indicated in the above FIGS. 16 and 17 are denoted with identical references. In this processing unit 2, liquid is supplied from outside via supply ports 81, 82. Such supply ports 81, 82 can be opened at a plurality of points, also allowing them to supply different kinds of liquids.

Figure 19:
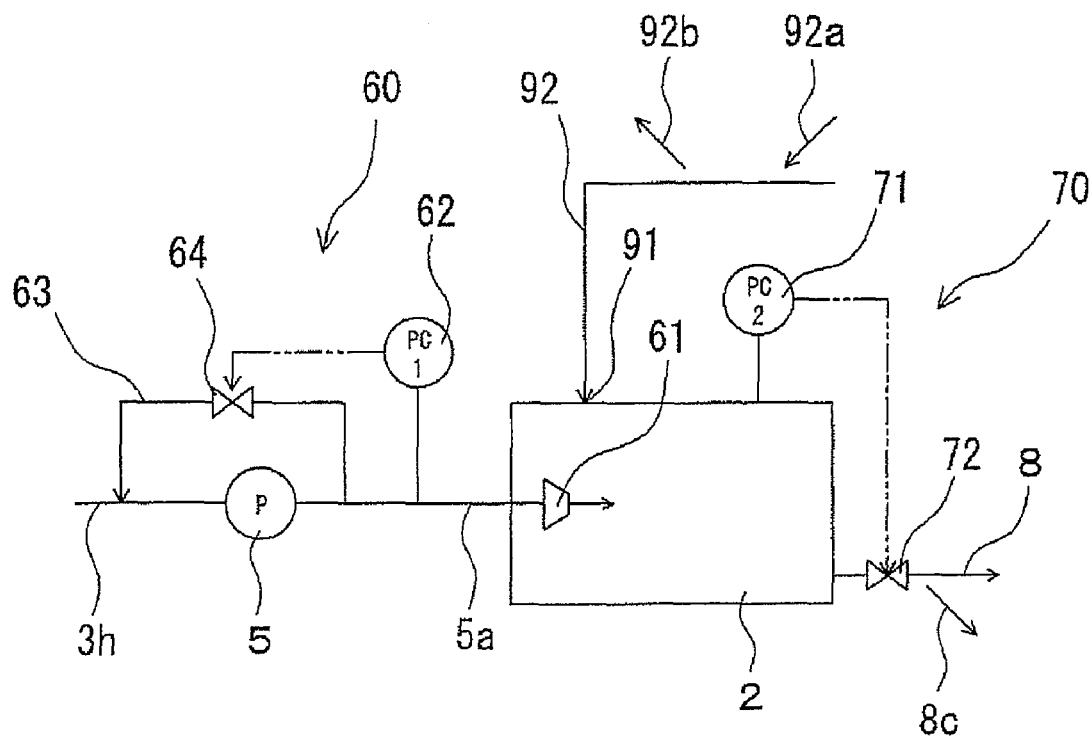
FIG. 19 schematically explains the mode of pressure regulation in the papermaking raw material processor of the present invention, showing the surroundings of the pump and the processing unit, together with distribution channels to the processing unit and feed paths of reformed raw materials for papermaking.

FIG. 19 shows supply port 91, other than nozzle 61, opened to supply liquid into processing unit 2. Here, the same parts as indicated in the above FIGS. 16 and 17 are denoted with identical references. From first pump 5, low-concentration suspension is discharged, at a pressure kept constant by discharging pressure regulating means 60, to be jetted from nozzle 61 into processing unit 2, while high-concentration suspension is fed from supply port 91 for reforming processing. Supply pipe 92 connected to supply port 91 has supplemental supply pipe 92a for supplemental supply of suspension and feeding pipe 92b to feed isolated papermaking raw material to downstream operations. Moreover, the outlet piping 8 has the collection port 8c to take out papermaking raw material before isolated. Incidentally, papermaking raw material can be isolated from the reformed suspension by cleaner or F/T (Flotator), optionally arranged in processing unit 2, thereby allowing raw material from reformed suspension to be discharged from processing unit 2.

Explanation has been made about the above-explained embodiment, referring to a single line but a plurality of lines should preferably be arranged in parallel to perform reforming processing to enable quick response to increase or decrease in processing amount, when this papermaking raw material processor is actually installed.

The present invention relates to a papermaking raw material processor capable of simplifying the reforming step in the paper making process, while being less damaging to the fiber, in order to supply, to the filtering step, long-fiber pulp, thereby facilitating reuse of used paper and contributing to savings in resources by effective use of the paper.

Changes and modifications in the specifically described embodiments can be carried out without departing from the principles of the invention which is intended to be limited only by the scope of the appended claims, as interpreted according to the principles of patent law including the doctrine of equivalents.

REFERENCE NUMERALS OF THE DRAWINGS

1. Papermaking raw material processor
2. Processing unit
2c. Short pipe with nozzle (jet short pipe)
2f. Central nozzle pipe (Central jet pipe)
2g. Marginal nozzle pipe (Marginal jet pipe)
2i. Surrounding wall nozzle pipe (Surrounding wall jet pipe)
3. First tank (supply tank)
4. Second tank (supply tank)
5. First pump
6. Second pump
11. Nozzle (jet)
11a. Nozzle tip
20. Papermaking raw material processor
31. Open/close valve
32a to 32d. Open/close valves
60. Discharge pressure regulation means
62. Pressure detector
63. Return pipe
64. Regulating valve
70. Outlet pressure control means
71. Internal pressure detector
72. Regulating valve

The invention claimed is:

1. A papermaking raw material processor, said papermaking raw material processor comprising:
a processing unit adapted to supply a suspension containing a papermaking raw material and to generate cavitation;
a pump adapted to generate pressure to supply the suspension into the processing unit;
said processing unit including a jet that receives the suspension from said pump, said jet adapted to create a jet stream of the suspension and to generate cavitation bubbles with the jet stream, said jet further adapted to bring the cavitation bubbles into contact with the papermaking raw material in suspension to process the papermaking raw material with intensive impact from collapse of the cavitation bubbles; and
a supply tank adapted to store the suspension, wherein the suspension is supplied from the pump via the jet into the processing unit to feed the papermaking raw material to downstream steps or to return the papermaking raw material to the supply tank.

2. A papermaking raw material processor according to claim 1, wherein said pump is a high-pressure pump.

3. A papermaking raw material processor according to claim 1, including an outlet pressure regulator adapted to seal the processing unit, detect the outlet pressure of the processing unit, and to control the pressure inside the processing unit, based on a value of the detected pressure.

4. A papermaking raw material processor according to claim 1, wherein the processing unit comprises a plurality of jets directed so as to jet the suspension to the processing unit in a direction generally parallel with an axial direction of the processing unit.

5. A papermaking raw material processor according to claim 1, including a discharging pressure regulator adapted to detect the pressure of the suspension jetted from the discharging outlet of the pump and to control the pump discharging pressure, based on a value of the detected pressure.

6. A papermaking raw material processor according to claim 1, wherein the processing unit comprises a plurality of jets tilted so as to jet the suspension to the processing unit in a direction toward a downstream side of the processing unit, relative to an axial direction of the processing unit.

7. A papermaking raw material processor, said papermaking raw material processor comprising:
a processing unit adapted to supply a suspension containing a papermaking raw material and to generate cavitation;
a pump adapted to generate pressure to supply the suspension into the processing unit;
said processing unit including a jet that receives the suspension from said pump, said jet adapted to create a jet stream of the suspension and to generate cavitation bubbles with the jet stream, said jet further adapted to bring the cavitation bubbles into contact with the papermaking raw material in suspension to process the papermaking raw material with intensive impact from collapse of the cavitation bubbles;

a supply tank adapted to store the suspension, wherein the suspension is supplied from the pump via the jet into the processing unit to feed the papermaking raw material to downstream steps or to return the papermaking raw material to the supply tank;

wherein said pump is a high-pressure pump; and a discharging pressure regulator adapted to detect the pressure of the suspension jetted from a discharging outlet of the pump and to control the pump discharging pressure, based on a value of the detected pressure.

8. A papermaking raw material processor, said papermaking raw material processor comprising:

a processing unit adapted to supply a suspension containing a papermaking raw material and to generate cavitation;

a pump adapted to generate pressure to supply the suspension into the processing unit;

said processing unit including a jet that receives the suspension from said pump, said jet adapted to create a jet stream of the suspension and to generate cavitation bubbles with the jet stream, said jet further adapted to bring the cavitation bubbles into contact with the papermaking raw material in suspension to process the papermaking raw material with intensive impact from collapse of the cavitation bubbles, wherein the processing unit comprises a plurality of parallel jets directed in a direction almost parallel with an axial direction of the processing unit and a plurality of jets tilted so as to direct the jet stream in a direction toward a center of the processing unit relative to a direction from upstream to downstream; and a supply tank adapted to store the suspension, wherein the suspension is supplied from the pump via the jet into the processing unit to feed the papermaking raw material to downstream steps or to return the papermaking raw material to the supply tank.

9. A papermaking raw material processor according to claim 8, wherein the parallel jets are arranged on an upstream wall body of the processing unit and the tilted jets are disposed on the side-wall of the processing unit at appropriate intervals in the direction of the jet stream.

10. A papermaking raw material processor according to claim 9, wherein the parallel jets jet the suspension and the tilted jets jet the jet liquid.

* * * * *